(12) United States Patent
Muramatsu et al.

(10) Patent No.: US 6,390,503 B2
(45) Date of Patent: May 21, 2002

(54) OCCUPANT'S KNEE PROTECTION SYSTEM

(75) Inventors: Mutsuo Muramatsu, Tokai; Shigeyuki Nozumi, Anjo; Shinji Hara, Aichi; Mikiharu Shimoda, Okazaki; Toshiaki Isogai, Nagoya, all of (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 09/735,671

(22) Filed: Dec. 13, 2000

(30) Foreign Application Priority Data

Dec. 13, 1999 (JP) .......................................... 11-353302

(51) Int. Cl.[7] ............................................. B60R 21/05
(52) U.S. Cl. ...................................... 280/750; 280/748
(58) Field of Search ................................ 280/748, 750, 280/751, 752; 296/189, 352

(56) References Cited

U.S. PATENT DOCUMENTS

| 3,907,326 A | * | 9/1975 | Arntson et al. | ............. 280/752 |
| 3,930,665 A | * | 1/1976 | Ikawa | ........................ 280/751 |
| 3,938,821 A | * | 2/1976 | Haas et al. | .................. 280/777 |
| 3,964,578 A | * | 6/1976 | Campbell et al. | ........... 280/751 |
| 4,194,762 A | * | 3/1980 | Sudo | ........................... 280/751 |
| 4,383,704 A | * | 5/1983 | Yoshitsugu | ................. 280/750 |
| 4,834,422 A | * | 5/1989 | Oikawa et al. | ............. 280/750 |
| 4,949,990 A | * | 8/1990 | Hirahara et al. | ........... 280/750 |
| 5,238,286 A | * | 8/1993 | Tanaka et al. | ................ 296/70 |
| 5,577,770 A | * | 11/1996 | Sinner et al. | ............... 280/752 |

* cited by examiner

Primary Examiner—Paul N. Dickson
Assistant Examiner—Faye M. Fleming
(74) Attorney, Agent, or Firm—Rossi & Associates

(57) ABSTRACT

The present invention comprises a column support fixed to a deck cross member extending along a width of a vehicle; a steering column supported by the column support; a column bracket disposed about an axis of the steering column in such a manner as to widen toward a front part of the vehicle, both ends of the column bracket being fixed to a body of the vehicle; and knee absorbers disposed at both sides of the column bracket, each of the knee absorbers having a base end fixed to the deck cross member and a front end facing the knees of an occupant, the front end coming into contact with the knees of the occupant. When the vehicle crashes, the occupant and his or her knees move forward to collide with the column bracket. The column bracket, however, is not displaced since both ends of the column bracket are fixed to the body of the vehicle. The knees of the occupant are guided forward along the surface of the column bracket to the right and left knee absorbers. This prevents the deformation of the steering column, and prevents the disturbance of the contracting function of a steering system for absorbing the impact energy. Moreover, the knee absorbers buckle and deform when the knees collide with them, and this results in the absorption of the impact energy to reduce the load that is applied to the knees. It is therefore possible to protect the knees of the occupant.

9 Claims, 2 Drawing Sheets

OCCUPANT'S KNEE PROTECTION SYSTEM

BACKGROUND OF THE INVENTION

1. Field of the Invention

The present invention relates to an occupant's knee protection system for protecting the knee of an occupant when a vehicle crashes.

2. Description of Related Art

An energy absorbing steering system has conventionally been used in vehicles which enables the axial contraction of a steering shaft and a steering column to absorb impact energy applied to an occupant in order to protect the occupant when a vehicle crashes. A column protector protects the steering column to prevent the knees of the occupant from contacting the steering column when the vehicle crashes. This prevents the contracting operation of the steering system from being disturbed.

Japanese Utility Model Provisional Publication No. 1-73464, for example, discloses a system for protecting the knees of an occupant by preventing the knees from contacting a steering column when a vehicle crashes. In this protection system, a curved protector is provided at the driver's seat side of a tilt bracket, and this protector is comprised of a steering column and a plate, which is supported and fixed by a substantially Z-shaped stay. The surface of the protector at the driver's seat side is coated with an urethane layer and a cover in order to prevent the knees and legs of the occupant from directly colliding with the tilt bracket when the vehicle crashes. This reduces the impact energy that is applied to the knees and legs.

If the occupant is of small stature, there is only a small distance between the right and left knees. Thus, depending on the layout of a vehicle, the knees may collide with the steering column when the vehicle crashes, and this results in an insufficient absorption of the energy and an increase in the load applied to the knees. The protection system, whose protector is comprised of the steering column and the plate supported and fixed by the substantially Z-shaped stay, is attached to the steering column, which deforms and moves toward the front of the vehicle when the vehicle crashes. Accordingly, the protector also moves toward the front of the vehicle when the occupant collides with the protector, and this results in an insufficient reduction of the impact energy by the deformation of the protector. It is therefore difficult to satisfactorily absorb the impact load applied to the knees. Moreover, the knees may collide with the steering column as well as the deformed protector, and this disturbs the contracting operation of the steering column.

SUMMARY OF THE INVENTION

It is therefore an object of the present invention to provide an occupant's knee protection system, which absorbs the impact energy applied to the knees by knee absorbers when a vehicle crashes.

The above object can be accomplished by providing an occupant's knee protection system comprising: a column support fixed to a deck cross member extending along a width of a vehicle; a steering column supported by the column support; a column bracket disposed about an axis of the steering column in such a manner as to widen toward a front part of the vehicle, both ends of the column bracket being fixed to a body of the vehicle; and knee absorbers disposed at both sides of the column bracket, each of the knee absorbers having a base end fixed to the deck cross member and a front end facing the knees of an occupant, the front end coming into contact with the knees of the occupant; wherein when the vehicle crashes, the column bracket guides the knees of the occupant to the knee absorbers, and the knee absorbers absorb impact energy applied to the knees of the occupant.

According to this occupant's knee protection system, the occupant seated in the driver's seat moves forward when the vehicle crashes, and the knees move forward accordingly to collide with the column bracket. Since both ends of the column bracket are fixed to the body, the column bracket never deforms if it collides with the knees of the occupant. This prevents the deformation of the steering column, and prevents the contracting function of the steering system for absorbing the impact energy from being disturbed. On the other hand, the column bracket is formed in such a manner as to widen toward the front of the vehicle. Thus, the right and left knees of the occupant move forward along the surface of the column bracket and are guided to the right and left knee absorbers disposed at both sides of the column bracket. When the knee absorbers collide with the knees, they buckle and deform to absorb the impact energy and reduce the knee load. This protects the knees of the occupant.

Therefore, if the vehicle crashes while an occupant with a small distance between the knees is driving, the column bracket can guide the knees of the occupant to the knee absorbers. The knee absorbers can satisfactorily absorb the impact energy applied to the knees to thereby protect the knees. Moreover, since the column bracket and the knee absorbers are fixed to the deck cross member that never moves to the front of the vehicle even when the vehicle crashes, the knees of the occupant can be guided satisfactorily to enable the efficient absorption of the impact energy.

In one preferred mode of the present invention, the knee absorbers are made of a plate member that deforms toward a front of said vehicle due to contact with the knee of the occupant. The knee absorbers preferably have at least one bend part, which is crank-shaped. Therefore, the contact between the knee absorbers and the knees of the occupant results in the effective absorption of the impact energy.

In another preferred mode of the present invention, the knee absorbers are covered with an undercover formed of a resin member. In yet another preferred mode of the present invention, the column bracket is substantially U-shaped and has a bottom part at a rear part of the vehicle and an end part at a front part of the vehicle.

In yet another preferred mode of the present invention, the column bracket is substantially V-shaped in such a manner as to widen from a rear part of the vehicle toward a front part of the vehicle. In yet another preferred mode of the present invention, a reinforcing bead is formed at a longitudinal side of the column bracket.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of the present invention will be described hereinbelow with reference to the accompanying drawings.

Figure 1:
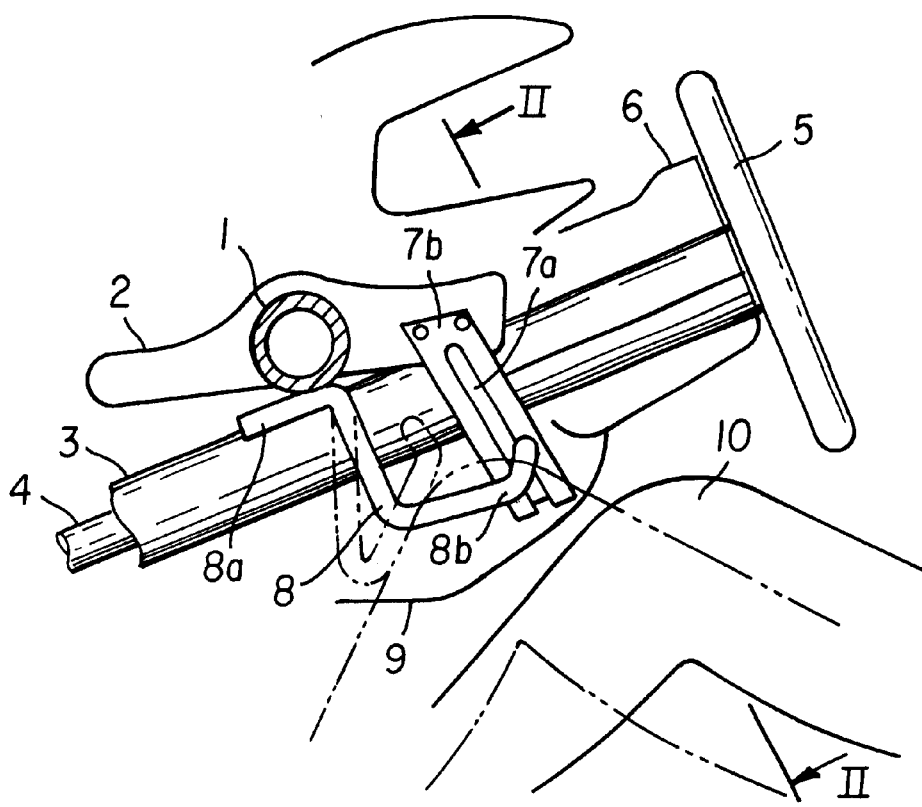
FIG. 1 is a schematic block diagram showing a steering system facing a driver's seat, to which an occupant's knee protection system of the present invention is applied.
Figure 2:
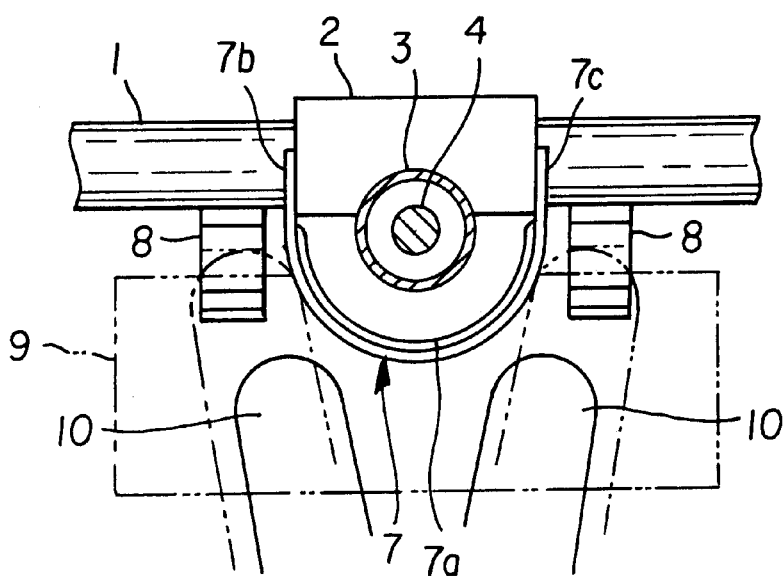
FIG. 2 is a sectional view of an occupant's knee protection system along line II—II of FIG. 1 according to the first embodiment of the present invention.

FIG. 1 is a schematic block diagram showing a steering system facing a driver's seat, to which an occupant's knee protection system of the present invention is applied. FIG. 2 is a sectional view showing the first embodiment of the present invention along line II—II of FIG. 1.

As shown in FIGS. 1 and 2, a deck cross member 1 as a body member extends horizontally along the width of a vehicle, and the right and left ends of the deck cross member 1 are respectively welded and fixed to right and left front pillars (not shown). A column support 2 is disposed to face a driver's seat, and is welded and fixed to the deck cross member 1. The upper part of a steering column 3 is fixed to the column support 2. A steering shaft 4 goes through the center of the steering column 3. The bottom end of the steering shaft 4 connects to a steering gear box (not shown) through a steering joint (not shown), and a steering wheel 5 is mounted at the top end of the steering shaft 4. The upper part of the steering column 3 is covered with a column cover 6.

A column bracket 7 is disposed about an axis of the steering column 3, and there is a space between the column bracket 7 and the steering column 3. The column bracket 7 is substantially U-shaped in such a manner as to widen toward the front of the vehicle, and is positioned in such a manner as to guide the right and left knees 10 to the side when an occupant seated in the driver's seat moves forward when the vehicle crashes. The column bracket 7 is formed of thick band steel with a high rigidity so as not to disturb the contracting operation of the steering column 3, i.e., so as to prevent deformation when the vehicle crashes. A reinforcing bead 7a is formed along the longitudinal side of the column bracket 7. Both ends 7b, 7c of the column bracket 7 are tightly fixed to both sides of the column support 2 by bolts or welding.

Knee absorbers 8, 8 are positioned at the right and left sides of the column bracket 7 in such a manner as to receive the right and left knees of the occupant when he or she moves forward when the vehicle crashes. The knee absorber 8, which is substantially shaped like a crank, has two bend parts and a base end 8a thereof is welded and fixed to the deck cross member 1. A front end 8b of the knee absorber 8 faces the knee 10 of the occupant at a distance, and comes into contact with the knee 10 of the occupant 10. The knee absorber 8 is formed of band steel with a high rigidity. The column bracket 7 and the right and left knee absorbers 8, 8 are covered with an undercover 9 made of resin so as to improve the appearance of an area around the driver's seat.

The operation of the device will now be described. When the occupant is seated in the driver's seat, the right and left knees 10, 10 are positioned apart from each other and face each other across the column bracket 7 through the undercover 9. If the vehicle crashes and the occupant moves forward, the knees 10, 10 move forward accordingly and collide with the column bracket 7 while deforming the undercover 9. The column bracket 7 is curved in a substantial U-shape between the knees 10, 10. If the occupant is of small stature and there is only a short distance between the knees 10, 10, the right and left knees 10, 10 are moved away from the steering column 3 to the side along the curved surface of the column bracket 7 and are guided forward to the right and left knee absorbers 8, 8. In short, the column bracket 7 functions as a guide part for guiding the knees of the occupant. When the knees 10, 10 collide with front ends 8b, 8b of the knee absorbers 8, 8 as indicated by alternate long and two short dashes line, the resulting impact load buckles and deforms the knee absorbers 8, 8 in a substantial Z-shape. Thus, the knee absorbers 8, 8 absorb the impact load. Consequently, the knee absorbers 8, 8 efficiently absorb the impact energy applied to the knees 10, 10 and reduce the impact load to thereby protect the knees 10, 10 of the occupant.

The high rigidity of the column bracket 7 prevents the column bracket 7 from deforming when it collides with the knees 10, 10 of the occupant. This prevents the deformation of the steering column 3. Therefore, the contracting function of the steering shaft 4 is executed normally without any disturbance to thereby protect the occupant.

Since the column bracket 7 and the knee absorbers 8 are fixed to a deck cross member that never moves to the front of the vehicle even when the vehicle crashes, the knees of the occupant can be guided satisfactorily and the impact energy can be absorbed sufficiently.

Figure 3:
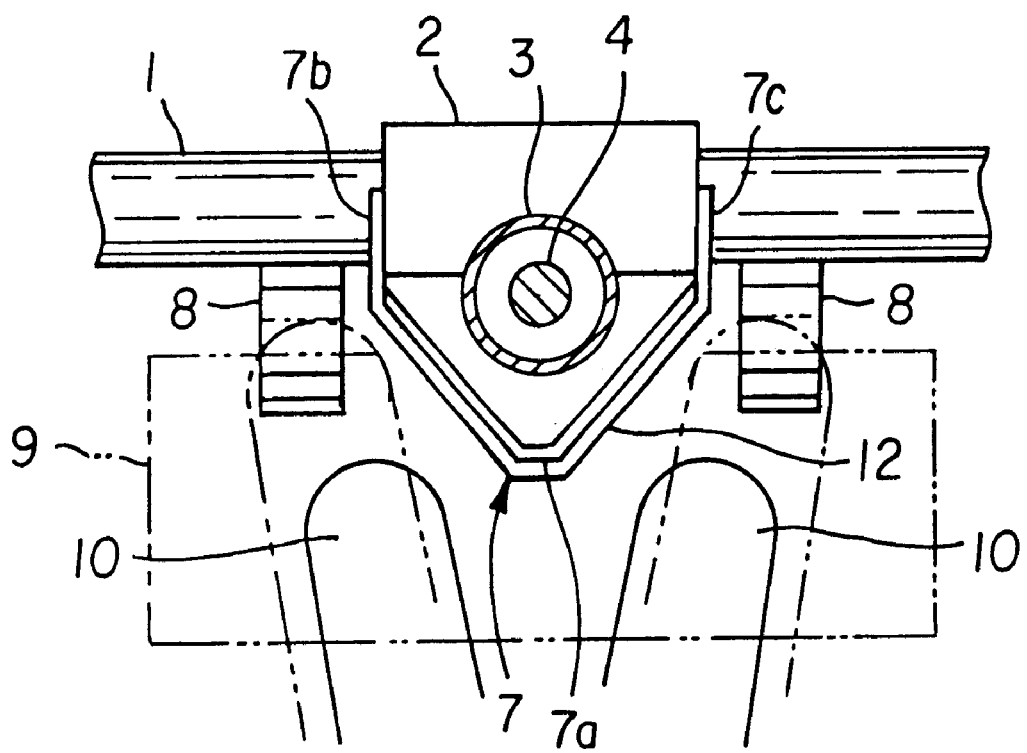
FIG. 3 is a sectional view of an occupant's knee protection system along line II—II of FIG. 1 according to the second embodiment of the present invention.

Referring next to FIG. 3, a second embodiment of the present invention is described. FIG. 3 is a sectional view taken along line II—II of FIG. 1. The column bracket 7 is formed of thick band steel with a high rigidity in order to disturb the contracting operation of the steering column 3 when the vehicle crashes. The reinforcing bead 7a is formed at the longitudinal side of the column bracket 7. Both ends 7b, 7c of the column bracket 7 are tightly fixed to both sides of the column support 2 by bolding or welding.

The knee absorbers 8, 8 are arranged at the right and left sides of the column bracket 7 and are positioned in such a manner as to receive the right and left knees when the occupant seated in the driver's seat move forward when the vehicle crashes. Each knee absorber 8 is substantially shaped like a crank. The base ends 8a, 8a of the knee absorbers 8, 8 are welded and fixed to the deck cross member 1, and the front ends 8a, 8a of the knee absorbers 8, 8 come into contact with the knees 10, 10. The knee absorbers 8, 8 face the knees 10, 10 at a distance. The knee absorbers 8, 8 are formed of band steel with a high rigidity. The column bracket 7 and the right and left knee absorbers 8, 8 are covered with the undercover 9 made of resin in order to improve the appearance of an area around the driver's seat.

The present embodiment is characterized in that the column bracket 7 is substantially V-shaped in such a manner as to widen from the rear part to the front part of the vehicle. Therefore, the knee absorbers 8 can smoothly guide the right and left knees 10, 10 along a slope 12, and the knees 10, 10 buckle and deform in substantially a Z-shape to thereby absorb the impact load.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:
1. An occupant's knee protection system comprising:
 a column support fixed to a deck cross member extending along a width of a vehicle;
 a steering column supported by said column support;
 a column bracket disposed about an axis of said steering column in such a manner as to widen toward a front part of said vehicle, both a first end and a second end of said column bracket being fixed to a body of said vehicle; and knee absorbers disposed at both sides of said column bracket, each of said knee absorbers having a base end fixed to said deck cross member and a front end facing the knees of an occupant, said front end coming into contact with the knees of said occupant;

wherein when said vehicle crashes, said column bracket guides the knees of said occupant to said knee absorbers, and said knee absorbers absorb impact energy applied to the knees of said occupant.

2. An occupant's knee protection system according to claim 1, wherein each of said knee absorbers is made of a plate member that deforms toward a front of said vehicle due to contact with the knee of the occupant.

3. An occupant's knee protection system according to claim 2, wherein each of said knee absorbers has at least one bend part.

4. An occupant's knee protection system according to claim 3, wherein each of said knee absorbers is formed in a substantially crank-shape.

5. An occupant's knee protection system according to claim 4, wherein each of said knee absorbers deforms in a substantial Z-shape toward a front part of said vehicle.

6. An occupant's knee protection system according to claim 1, wherein said knee absorbers are covered with an undercover formed of a resin member.

7. An occupant's knee protection system according to claim 1, wherein said column bracket is substantially U-shaped and has a bottom part at a rear part of said vehicle and an end part at a front part of said vehicle.

8. An occupant's knee protection system according to claim 1, wherein said column bracket is substantially V-shaped in such a manner as to widen from a rear part of said vehicle toward a front part of said vehicle.

9. An occupant's knee protection system comprising:

a column support fixed to a deck cross member extending along a width of a vehicle;

a steering column supported by said column support;

a column bracket disposed about an axis of said steering column in such a manner as to widen toward a front part of said vehicle, both ends of said column bracket being fixed to a body of said vehicle; and knee absorbers disposed at both sides of said column bracket, each of said knee absorbers having a base end fixed to said deck cross member and a front end facing the knees of an occupant, said front end coming into contact with the knees of said occupant;

wherein when said vehicle crashes, said column bracket guides the knees of said occupant to said knee absorbers, and said knee absorbers absorb impact energy applied to the knees of said occupant; and wherein a reinforcing bead is formed at a longitudinal side of said column bracket.

* * * * *